US006224243B1

(12) United States Patent
Karton (10) Patent No.: US 6,224,243 B1
(45) Date of Patent: *May 1, 2001

(54) BROODER LAMP FIXTURE WITH POWER CORD SUSPENDED IN ENCLOSURE

(76) Inventor: Richard L. Karton, 177 Camp Meeting Rd., Willow Grove, PA (US) 19090

( * ) Notice: Subject to any disclaimer, the term of this patent is extended or adjusted under 35 U.S.C. 154(b) by 0 days.

This patent is subject to a terminal disclaimer.

(21) Appl. No.: 09/408,438

(22) Filed: Sep. 29, 1999

Related U.S. Application Data

(63) Continuation-in-part of application No. 09/374,865, filed on Aug. 16, 1999.

(51) Int. Cl.[7] ............................................. F21S 8/06
(52) U.S. Cl. ..................... 362/408; 362/126; 362/404; 362/407; 362/433; 362/437; 362/438
(58) Field of Search ................................. 362/126, 147, 362/150, 391, 404, 407, 396, 433, 437–439, 441–443, 453, 457, 408, 805

(56) References Cited

U.S. PATENT DOCUMENTS 1,453,887 * 3/1923 Nutt ..................................... 362/353

* cited by examiner

Primary Examiner—Thomas M. Sember
Assistant Examiner—Ismael Negron
(74) Attorney, Agent, or Firm—Woodbridge & Associates, P.C.; Richard C. Woodbridge (57) ABSTRACT

An improved brooder lamp fixture for use in providing heating in brooder operations by infrared radiation, such as in swine and poultry breeding. The brooder lamp fixture has an integral electrical plug, cord and bulb socket, which holds an infrared bulb. A frame member has two interlocking semi-circular components surrounding the electrical cord proximate to the socket. The frame member extends radially outward from said cord a distance approximately equal to the width of the infrared bulb, and has a circular outer rim. A protective shade/enclosure is attached to the outer rim of the frame member and extends downward at least about nine inches to about fifteen inches from the frame member.

28 Claims, 6 Drawing Sheets

BROODER LAMP FIXTURE WITH POWER CORD SUSPENDED IN ENCLOSURE

37 C.F.R. §1.77(c)(1) Cross-reference to Related Applications

This Application is a Continuation-in-Part of U.S. patent application for Letters Patent Ser. No. 09/374,865, filed Aug. 16, 1999.

37 C.F.R. §1.77(d) Brief Summary of the Invention

BACKGROUND OF THE INVENTION

1. Field of the Invention

The present invention relates to an improved brooder lamp fixture for use in providing infrared radiation in brooder operations, such as for swine and poultry breeding.

2. Description of Related Art

In breeding operations, for the raising of live animals, it is common to provide a brooder heat source, such as an infrared radiation-generating lamp. This heat source is provided to keep chicks warm in poultry operations, or to draw suckling pigs away from a nursing sow in swine operations, to decrease suckling mortality. Other uses are also known.

In the prior art, such infrared heaters are no more than standard lighting fixtures in which an infrared bulb has been placed instead of a bulb providing visible light. They typically involve an electrical socket, and a domed-shaped metal reflector which would redirect visible light but does little or nothing when used with a direct radiation infrared bulb.

Such a prior art light fixture is heavy and awkward, and must typically be suspended from a chain, heavy wire, or cable. In addition, the high temperatures of the infrared radiation-generating bulb often causes the metal components to become too hot to touch in use. Wire hangers become bent, holding the unit at a slight angle and causing a non-uniform heating pattern in use. Further, the components often become corroded and unusable, since brooder operations often involve cleaning of the area with high-pressure water hoses. Such prior art fixtures often involve the need for grounded circuits as well.

Because the shade of the brooder lamp of the prior art is typically mounted below the socket assembly, the socket assembly is exposed to the environment. As such, the lamp socket assembly, and particularly the porcelain component of the lamp socket assembly, is easily damaged by direct contact with potentially damaging elements, such as water from a pressurized hose, or objects that could strike and shatter the porcelain component.

A further difficulty of the prior art fixtures discussed is that they must be assembled before shipment to the point of use, increasing the expense of shipment costs associated therewith.

SUMMARY OF THE INVENTION

It is an object of the present invention to provide an improved brooder lamp fixture for use in breeding operations.

It is a further object of the present invention to provide a brooder lamp fixture which hangs straight and provides a uniform heating pattern.

It is a still further object of the present invention to provide a brooder lamp fixture which can be handled more easily in use.

It is another object of the present invention to provide a brooder lamp fixture which is more adaptable to livestock breeding environments.

It is another object of the present invention to provide a brooder lamp fixture in which the socket component is protected from external forces within a protective environment formed by a frame member and a shade/enclosure.

It is another object of the present invention to provide a brooder lamp fixture which can be shipped in pre-wired pieces and assembled at the place of use.

The other objects, features and advantages of the present invention will become more apparent in light of the following detailed description of the preferred embodiment thereof.

37 C.F.R. §1.77(e) Brief Description of the Several View of the Drawing.

BRIEF DESCRIPTION OF THE DRAWINGS

37 C.F.R. §1.77(f) Detailed Description

DETAILED DESCRIPTION OF THE PREFERRED EMBODIMENT

Figure 1:
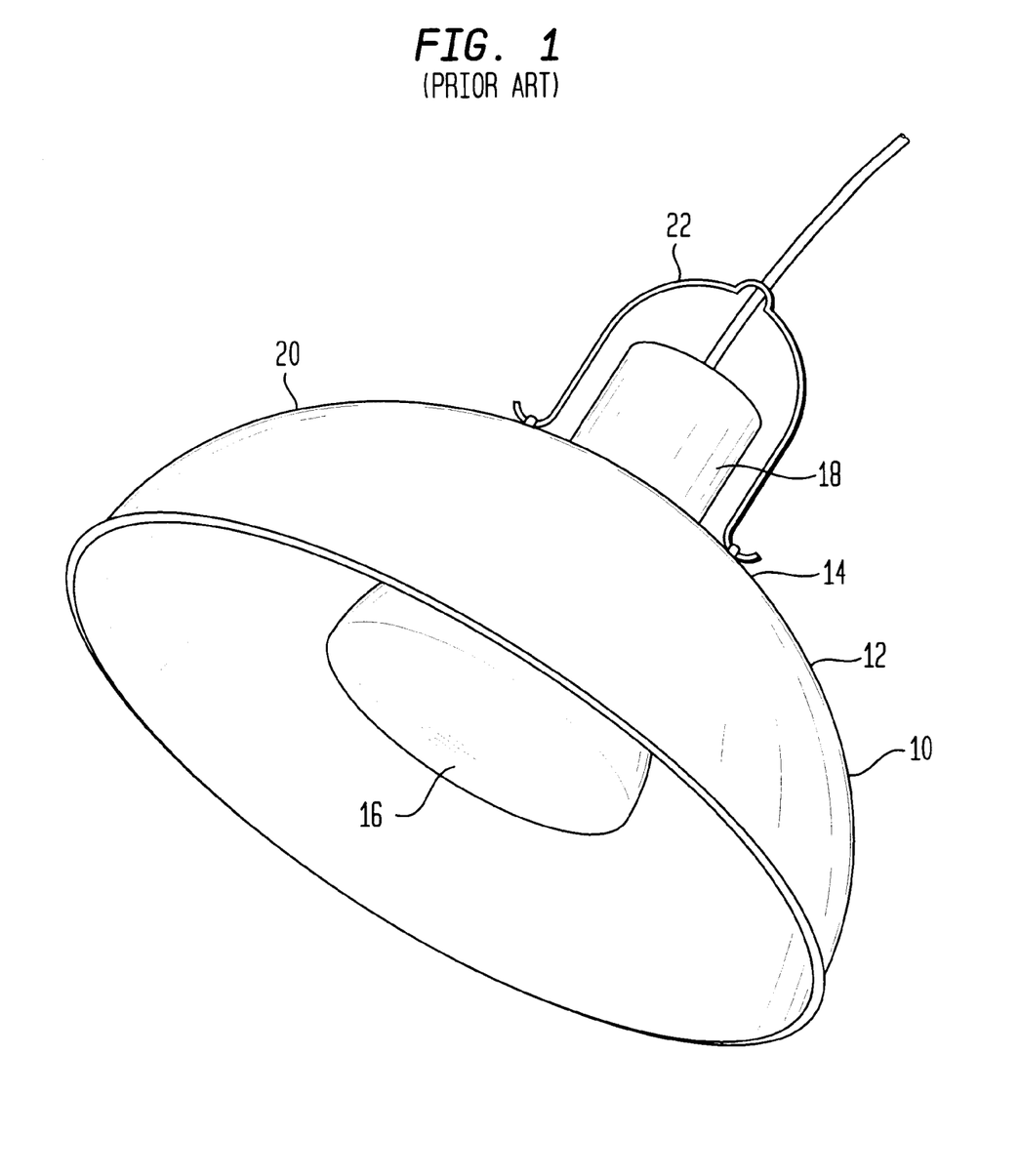
FIG. 1 shows a brooder lamp fixture of the prior art.

FIG. 1 shows a brooder lamp fixture (10) of the prior art. In the prior art, such an infrared light fixture (12) is typically no more than a standard lighting fixture (14) in which an infrared bulb (16) has been placed instead of a bulb providing visible light. The prior art brooder lamp fixture (10) typically involves an electrical socket (18), and a domed-shaped metal reflector (20) which would redirect visible light but does little or nothing when used with a direct radiation infrared bulb.

Such a prior art light fixture (12) is often heavy and awkward, and must typically be suspended from a chain, heavy wire, or cable hanger (22). In addition, the high temperatures of the infrared radiation-generating bulb often causes the metal components, particularly the domed-shaped metal reflector (20), to become too hot to touch in use. Hangers (22) can become bent, holding the unit at a slight angle and causing a non-uniform heating pattern in use. Further, the components often become corroded and unusable, requiring frequent repair or replacement, since brooder operations often involve cleaning of the area with high-pressure water hoses. Such prior art brooder lamp fixtures (10) often involve the need for grounded circuits as well.

Figure 2:
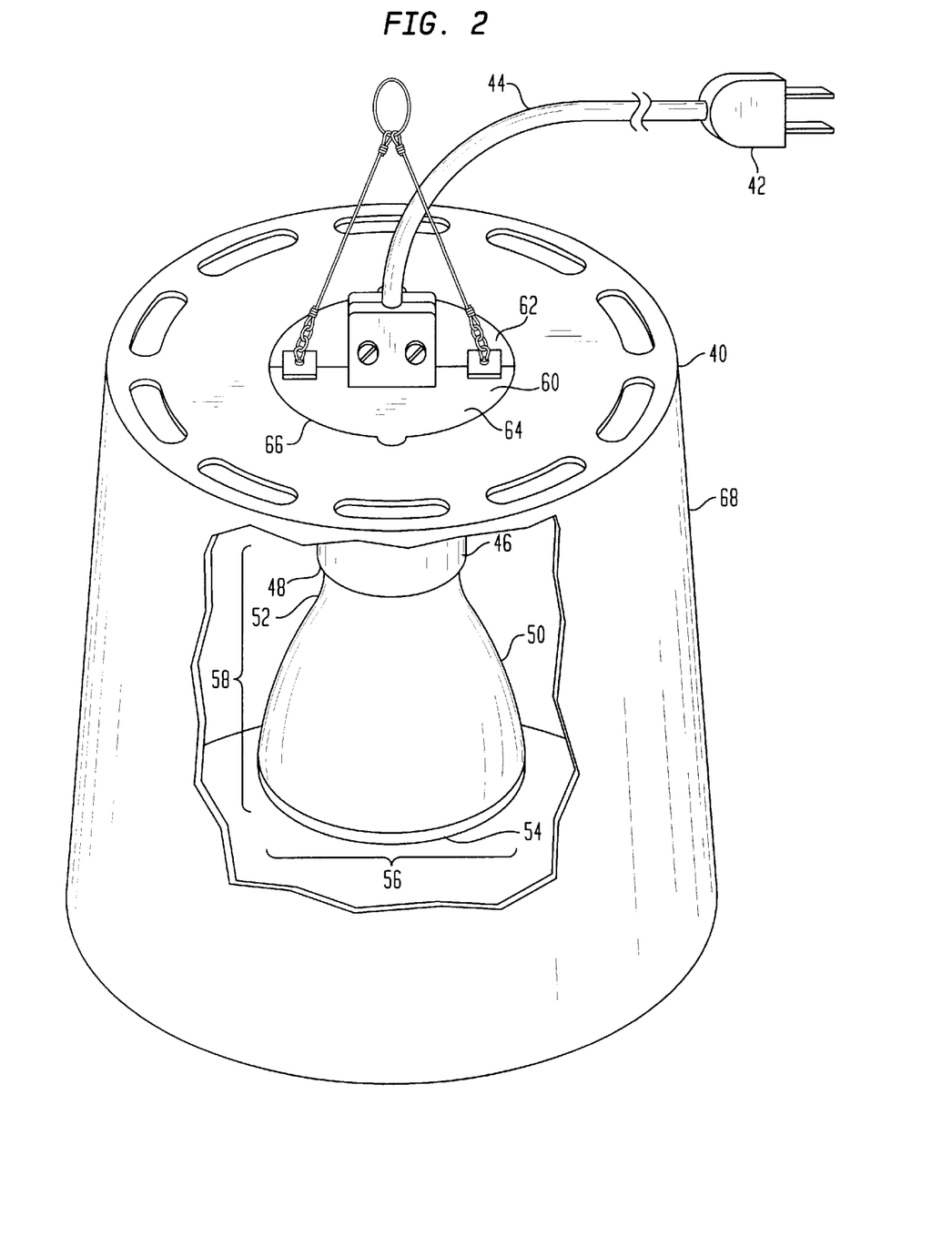
FIG. 2 shows an assembled brooder lamp fixture of the present invention.

FIG. 2 shows an assembled improved brooder lamp fixture (40) of the present invention. In this embodiment, there is shown an improved brooder lamp fixture (40) for use in providing infrared radiation in brooder light fixture operations, such as for swine and poultry. This brooder (40) comprises an integrally formed electrical plug (42), cord (44) and bulb socket (46). The socket (46) is provided with means (48) to engage an infrared radiation-generating bulb (50).

Preferably, the infrared radiation-generating bulb (50) is a lightweight infrared radiation-generating bulb and is engaged in the bulb socket (46) and depends therefrom. Further, the infrared bulb (50) has a narrow first end (52) adapted to engage the socket (46) and a broad second and opposite end (54) of larger dimension (56) adapted to provide infrared radiation therefrom. The first end (52) and the second and opposite end (54) of the infrared radiation-generating bulb (50) are separated by a length (58).

The assembled brooder lamp fixture (40) of FIG. 2 further comprises an interlocking mating frame member (60) engagedly surrounding the electrical cord (44) near the socket (46). This mating frame member (60) itself comprises a first interlocking semi-circular frame member component (62) and a second interlocking semi-circular frame member component (64). These frame member components (62) and (64) are adapted to combine together to surround and engage the electrical cord (44) proximate to the socket (46). By attaching the frame member (60) to the cord (44) in the proximity of the socket (46), rather than to the socket (46) itself, the socket (46) is able to have limited movement within the confines of a shade/enclosure (68). In this way, the socket (46) of the brooder lamp fixture (40) of the present invention can be enclosed within a protective environment, comprised of the frame member (60) and shade/enclosure (68), in order to shield it. The brooder lamp fixture (40) of the present invention is able to absorb external forces such as, but not limited to, pressure washing or being struck by objects, without damage to the socket (46). The socket (46), and particularly any porcelain component of the socket (46), which could be harmed by direct contact with potentially damaging elements, such as water from a pressurized hose, or objects that could strike and shatter the porcelain component, is protected from such contact within this protective environment.

With further to FIG. 2, the frame member (60) extends radially outward from the electrical cord (44) proximate to the socket (46) a distance of at least about approximately equal to said larger dimension (56) of the infrared bulb (50), and terminating in a circular outer rim (66).

The assembled brooder lamp fixture (40) of FIG. 2 further comprises a depending protective shade/enclosure member (68) adapted to fixedly engage the circular outer rim (66) of the mating frame member (60) and depend therefrom. Further, the depending protective shade/enclosure member (68) extends downward from the circular outer rim (66) a distance of at least about approximately equal to the length (58) of the infrared radiation-generating bulb (50).

Figure 3:
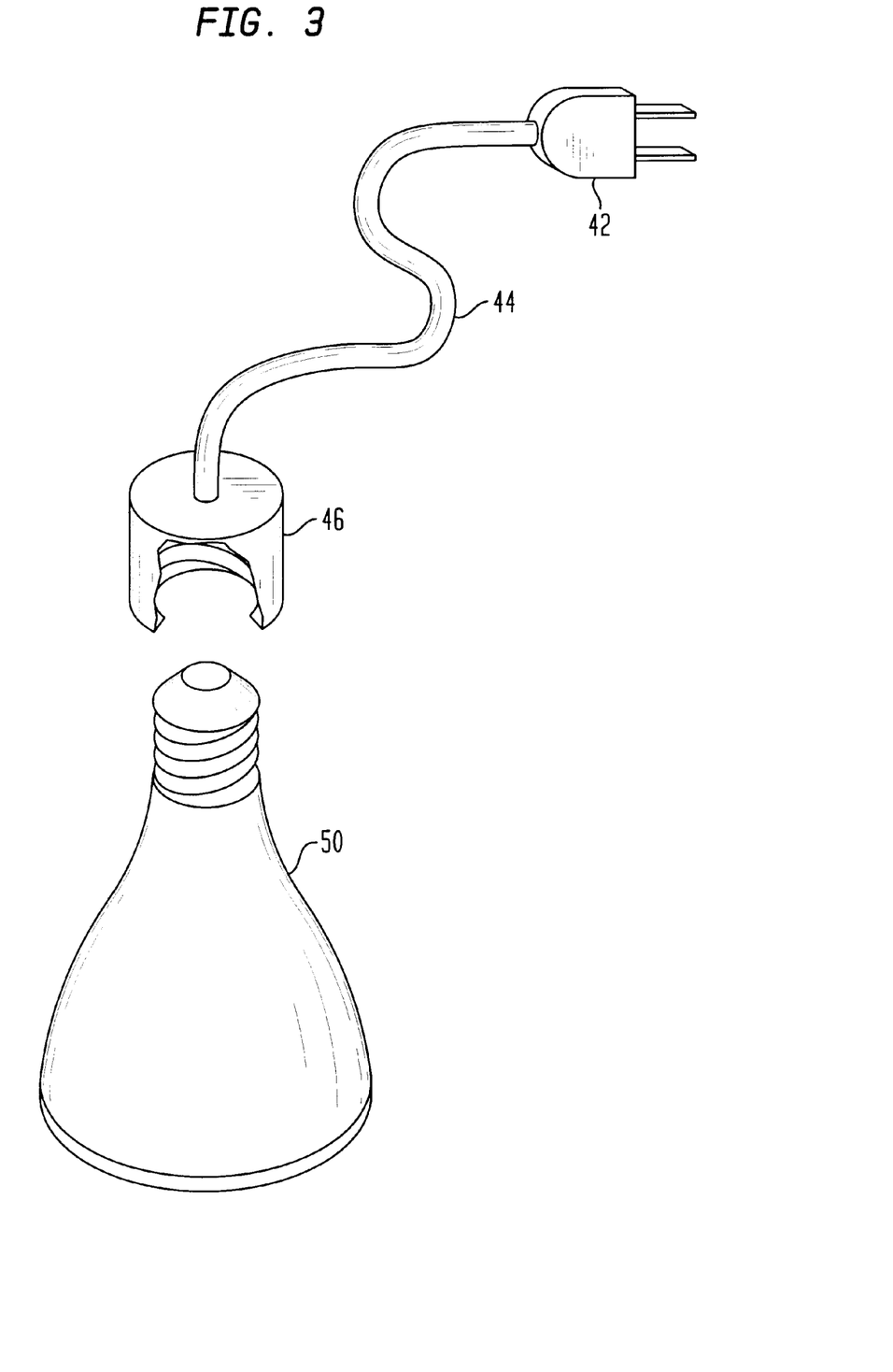
FIG. 3 shows the integral electrical plug, cord and bulb socket of the present invention, which holds an infrared bulb.

FIG. 3 shows greater detail of the integral electrical plug (42), cord (44) and bulb socket (46) of the present invention, which holds an infrared radiation-generating bulb (50). Unlike the device of the prior art, shown as (10) in FIG. 1, these components can be pre-combined into one integral assembly in the present invention. This is because the frame member (60) can be assembled around the electrical cord (44) proximate to the bulb socket (46), and the plug (42) and cord (44) can be passed through the depending protective shade/enclosure (68).

Figure 4:
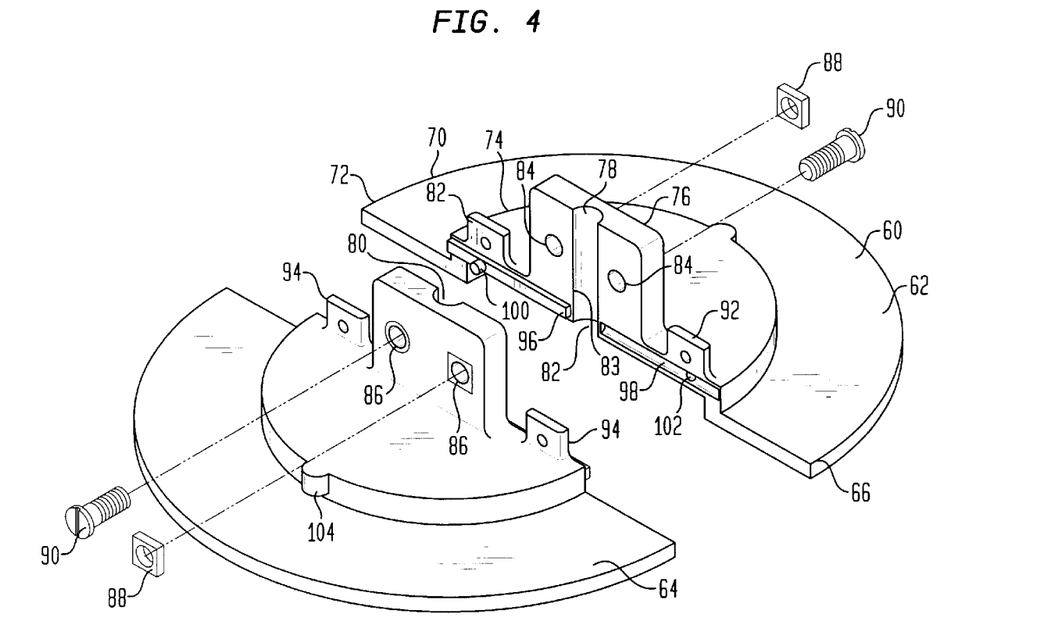
FIG. 4 shows an exploded view of the frame member of the present invention, comprising two mating and interlocking semi-circular frame member components.

FIG. 4 shows greater detail of the frame member (60) of the present invention in an exploded view. As noted previously, this frame member (60) comprises a first mating and interlocking semi-circular frame member component (62) and a second mating and interlocking semi-circular frame member component (64). Each of these frame member components (62) and (64) are preferably made identical and join with each other in an interlocking manner.

In the preferred embodiment, frame member components (62) and (64) are identical and interchangeable. The frame member component (62) consists of a semi-circular disc (70) having a broad lower level (72) and a slightly narrower upper level (74). The broad lower level (72) serves as a support for the shade/enclosure (68), as will be explained more fully hereinafter. The narrower upper level (74) is intended to project through a central opening in the shade/enclosure (68) when the brooder lamp fixture (40) of the present invention is assembled, as shown in FIG. 2. With further reference to FIG. 4, there is shown projecting upward from said narrower upper level (74) of frame member component (62) a central mating attachment member (76) comprising a central groove (78) intended to combine with a similar central groove (80) of frame member component (64) and surround the electrical cord (44) in the proximity of the socket (46).

The dimensions of the opening (82) formed by central groove (78) of frame member component (62) and central groove (80) of frame member component (64) are such that cord (44) is tightly enclosed and slightly compressed therebetween. It is also useful to provide a small, inwardly-facing vertical ridge (83) to assist in this attachment and prevent rotational or longitudinal movement of the frame member (60) on the cord (44).

The central attachment member (76) of frame member component (62) is further provided with attachment means (84) which are intended to mate with attachment means (86) of frame member component (64) and be fixedly attached by some means, such as nuts (88) and bolts (90).

With continued reference to FIG. 4, the narrower upper level (74) of first frame member (62) is further provided with hanging means (92). Similarly, second frame member (64) is further provided with hanging means (94). It is intended that hanging means (92) and (94) will mate allowing the brooder lamp fixture (40) of the present invention to be hung with two closable stainless steel S-hooks, two pieces of stainless steel cable and a stainless steel ring, using four nickel-plated copper clamps, as shown in FIG. 2.

In the preferred embodiment, a combination of raised edge (96) and groove (98) mate to help prevent water from a pressurized hose reaching the electrical socket (46). Also, an alignment pin (100) and hole (102) are useful in helping to quickly and accurately assemble the frame member (60).

Finally, the second frame member (64) shown in FIG. 4 also shows key (104) which assists in interlocking with the shade/enclosure (68), as will be described more fully hereinafter.

Figure 5:
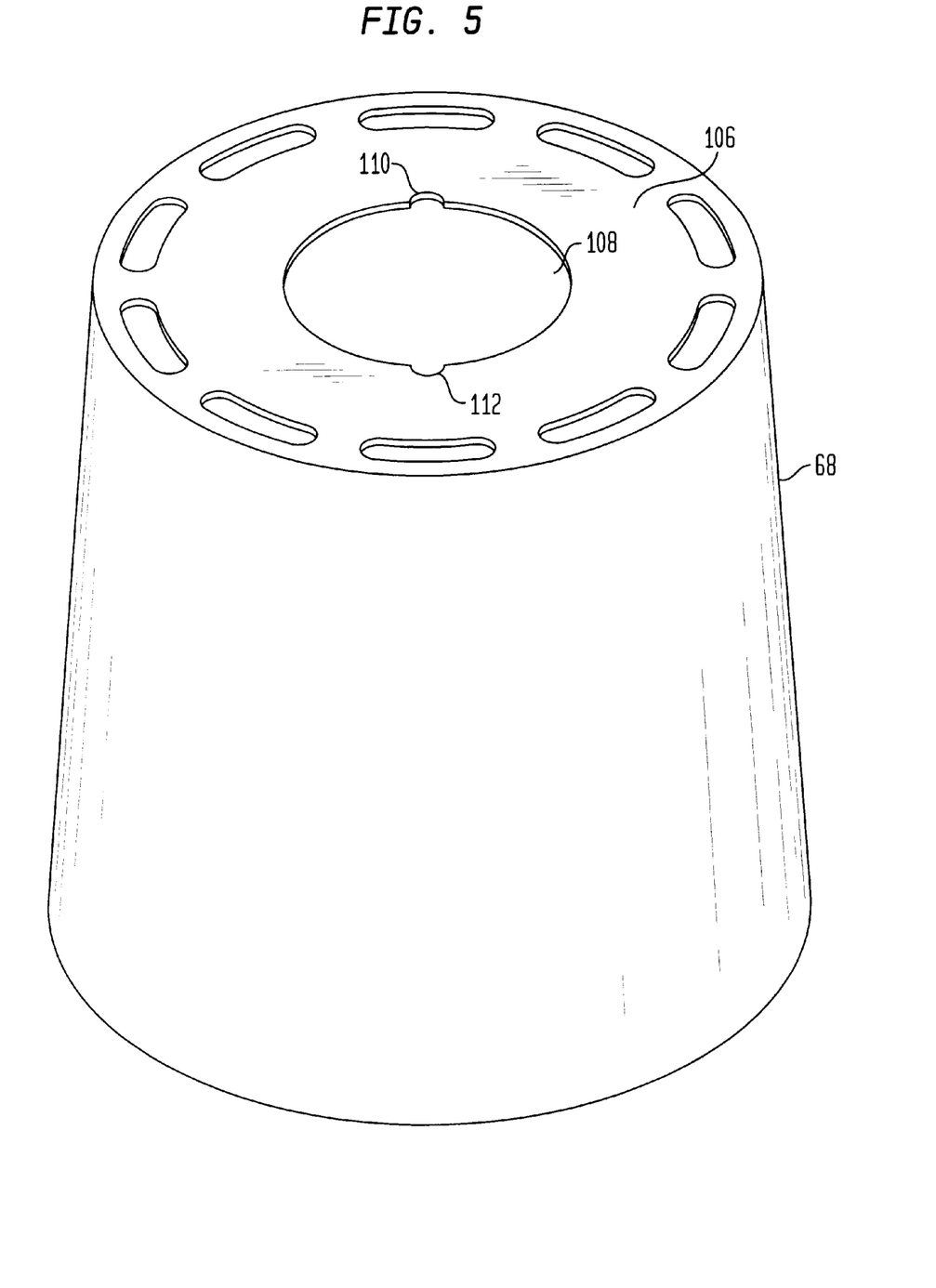
FIG. 5 shows a simplified shade/enclosure member of the present invention.

FIG. 5 shows greater detail of a simplified shade/enclosure (68) of the present invention. This drawing shows a depending protective shade/enclosure (68) adapted to fixedly engage the circular outer rim (66) of the mating frame member (60) and depend therefrom, and extending downwardly therefrom a distance of at least approximately equal to said length of said infrared bulb (50).

As noted previously, the upper portion (106) of shade/enclosure (68) is intended to rest upon the broad lower level (72) of frame member (60), with the narrower upper level (74) of frame member (60) protruding through central opening (108) of shade/enclosure (68). Further, notches (110) and (112) are provided in shade/enclosure (68) to enable the shade/enclosure (68) to pass into position over keys (104) and be turned into a fixed position.

Figure 6:
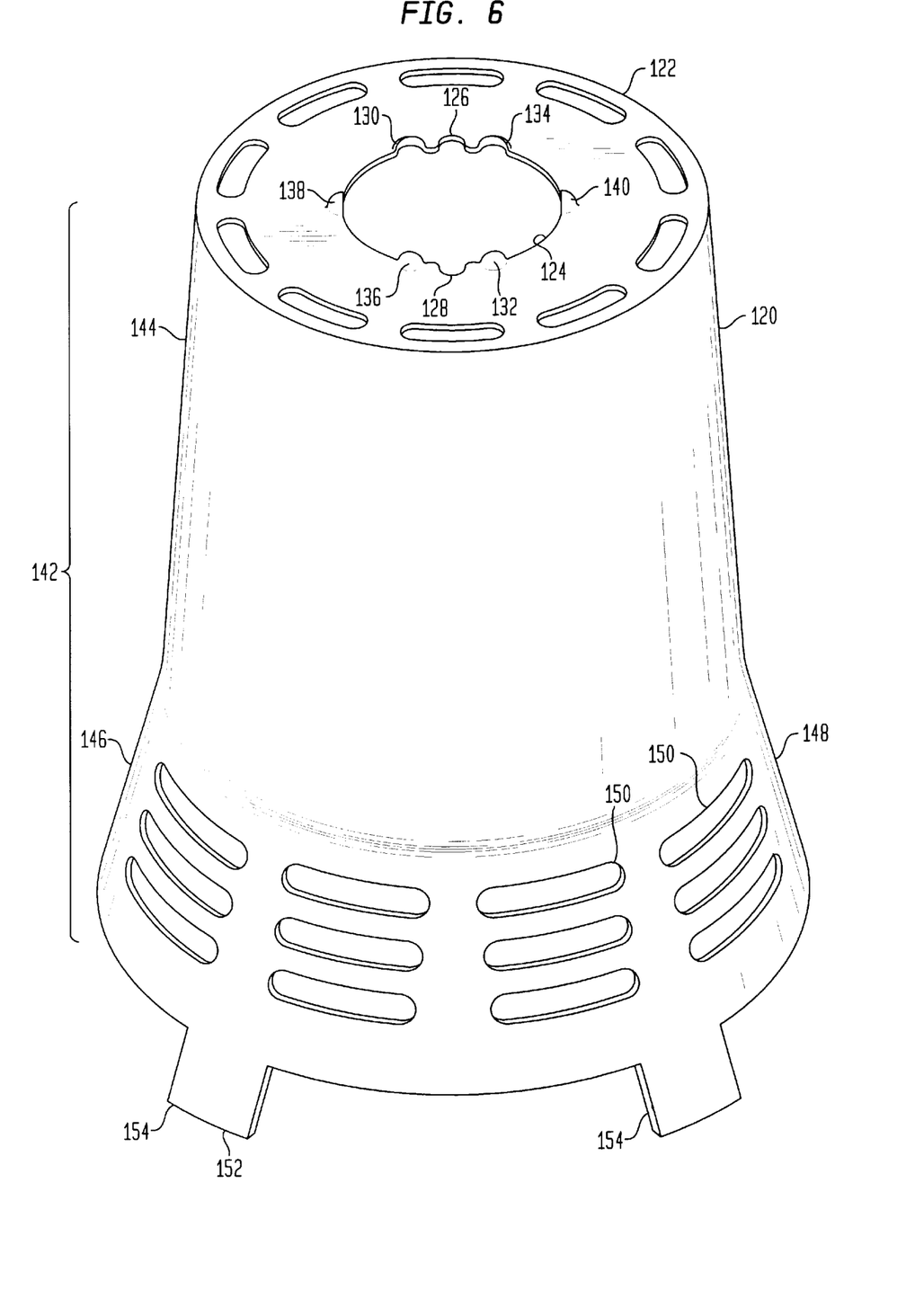
FIG. 6 shows the presently preferred embodiment of the shade/enclosure of the present invention.

FIG. 6 shows greater detail of a preferred shade/enclosure (120) of the present invention. This drawing shows a depending protective shade/enclosure (120) adapted to fixedly engage the circular outer rim (66) of the mating frame member (60) and depend therefrom, and extend downwardly a distance of at least about nine inches to about fifteen inches from said mating frame (60).

The length of the shade/enclosure (120) is important in that the temperatures generated by the infrared bulb (50) are greater closer to the bulb. something positioned too close to the source of the infrared radiation can be scorched or burned, and the length of the shade/enclosure prevents or at least limits such proximate contact. It has been found that a length of from at least about nine inches to about fifteen inches will limit such proximate contact. It has further been found that a length of ten inches to about fourteen inches is preferable. More preferred, however, is a length of from about eleven inches to about thirteen inches, and the length of the shade/enclosure in the preferred embodiment is about twelve and one-quarter inches from the frame member (60).

Also in the preferred embodiment, the length (142) of the shade/enclosure (120) is comprised of two sections which are integrally formed. The first section (144) is similar in character to the simplified shade/enclosure (68) previously described, and comprises most of the length of the shade/enclosure (120). The second section (146) preferably has a greater outward flare (148) and is provided with a plurality of open louvers (150) to permit greater air flow.

Although the shade/enclosure (68) of the simplified embodiment previously described is preferably provided with a slight outward flare, in order to permit stacking of the components in shipment, this flare is typically on the order of only a few degrees. The outward flare (148) of the second section (146) of the preferred shade/enclosure (120) of the present invention, on the other hand, is from about ten to about twenty degrees, more preferably from about twelve to about eighteen degrees, and most preferably about fifteen degrees.

Although the arrangement of louvers (150) is not believed to be critical, the present arrangement of eight radial sets of three louvers has been found to be satisfactory and to serve the circulation needs of the shade/enclosure (120) of the present invention.

It has also been found that the terminal end (152) of the second section (146) of the preferred shade/enclosure (120) of the present invention can be provided with three equi-radially positioned legs (154). These legs (154) serve the purpose of increasing the effective length (142) of the shade/enclosure (120), without unduly interfering with the distribution of infrared radiation. In addition, the three clearly articulated equi-radially spaced legs (154) (two of which are illustrated in FIG. 6) serve to define a plane if the brooder lamp fixture (40) of the present invention is set upon a surface rather than hung. Further, this plane is substantially perpendicular to the infrared radiation provided by the infrared bulb (50). One skilled in the art would recognize that this construction would have application wherever a localized heat source, or light source, might be useful, such as in the "setting" or "curing" of thermosetting or photopolymerizable resins, and the like.

As in the previously described embodiment, the upper portion (122) of shade/enclosure (120) is intended to rest upon the broad lower level (72) of frame member (60), with the narrower upper level (74) of frame member (60) protruding through central opening (124) of shade/enclosure (120). Further, notches (126) and (128) are provided in shade/enclosure (120) to enable the shade/enclosure (120) to pass into position over keys (104) and be turned into a fixed position.

Also provided in the preferred embodiment of the shade/enclosure (120) are raised, half-dome shaped members (130), (132), (134), and (136), each located proximate to said notches (126) and (128), with one half-dome shaped member located on either side of each notch. These half-dome shaped members serve to hold the shade/enclosure (120) in position once the keys (104) of the frame member (60) has been passed through notches (126) and (128) and over half-dome shaped members (130) and (132), or (134) and (136). It has also been found advantageous to provide an additional set of half-dome shaped members (138) and (140) to limit the travel of the shade/enclosure (120) relative to the frame member (60). Without this array of half-dome shaped members (130), (132), (134), (136), (138) and (140), it has been found that the keys (104) can find their way back into the notches (126) and (128) in the jostling of normal use, and the shape/enclosure (120) can become skewed and out-of-position.

One skilled in the art will recognize that the present invention can be prepared from many suitable materials, and that the mention of one material for a particular purpose does not exclude the use of a similar material for that purpose.

Other features, advantages, and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

37 C.F.R. §1.77(g) Claims:

What is claimed is:

1. An improved brooder lamp fixture for use in providing infrared radiation in brooder operations, such as for swine and poultry breeding, said brooder lamp fixture comprising:

an integral electrical plug, cord and bulb socket, said socket being provided with means to engage an infrared radiation-generating bulb;

a lightweight infrared radiation-generating bulb engaged in said socket and depending therefrom, said infrared bulb having a narrow first end adapted to engage said socket and a broad second and opposite end of larger dimension adapted to provide infrared radiation therefrom, said first end and said second and opposite end being separated by a length;

an interlocking mating frame member engagedly surrounding said electrical cord proximate to said socket, said mating frame member comprising a first and second interlocking semi-circular frame member component which frame member components are adapted to combine together to surround and engage said electrical cord, said frame member extending radially outward from said electrical cord proximate to said socket a distance of at least approximately equal to said larger dimension of said infrared bulb, and terminating in a circular outer rim; and, a depending protective shade/enclosure member adapted to fixedly engage said circular outer rim of said mating frame member and depend therefrom, and extending downward therefrom a distance of at least about nine inches to about fifteen inches from said frame member.

2. The improved brooder lamp fixture according to claim 1, wherein said depending protective shade/enclosure member extends downward a distance of at least about ten inches to about fourteen inches from said frame member.

3. The improved brooder lamp fixture according to claim 1, wherein said depending protective shade/enclosure member extends downward a distance of at least about eleven inches to about thirteen inches from said frame member.

4. The improved brooder lamp fixture according to claim 1, wherein said depending protective shade/enclosure member extends downward a distance of about twelve and one-quarter inches from said frame member.

5. The improved brooder lamp fixture according to claim 1, wherein said protective shade/enclosure member includes first and second spaced sections, said first section being proximate said mating frame members and said second section being distal from said mating frame member; and said second section of said protective shade/enclosure is flared outward by from about ten to about twenty degrees.

6. The improved brooder lamp fixture according to claim 5, wherein said second section of said protective shade/enclosure is flared outward by from about twelve to about eighteen degrees.

7. The improved brooder lamp fixture according to claim 6, wherein said second section of said protective shade/enclosure is flared outward by fifteen degrees.

8. The improved brooder lamp fixture according to claim 1 wherein said protective shade/enclosure member includes first and second spaced sections, said first section being proximate said mating frame members and said second section being distal from said mating frame member; and said second section of said protective shade/enclosure is provided with a plurality of open louvers.

9. The improved brooder lamp fixture according to claim 8 further comprising a plurality of spaced louvers located in said first section proximate to and radially outwardly from said outer rim.

10. The improved brooder lamp fixture according to claim 8, wherein said second section of said protective shade/enclosure is provided with a plurality of open louvers in an array of eight equi-radially spaced sets of three openings.

11. The improved brooder lamp fixture according to claim 10 further comprising a plurality of spaced louvers located in said first section proximate to and radially outwardly from said outer rim.

12. The improved brooder lamp fixture according to claim 1, wherein said protective shade/enclosure member includes first and second spaced sections, said first section being proximate said mating frame members and said second section being distal from said mating frame member; and said section of said protective shade/enclosure is provided with three equi-radially spaced legs defining a planar surface adapted for contact with another surface.

13. The improved brooder lamp fixture according to claim 12 further comprising a plurality of spaced louvers located in said first section proximate to and radially outwardly from said outer rim.

14. The improved brooder lamp fixture according to claim 1 wherein each of said interlocking mating frame members includes a key projecting radially outwardly from said circular outer rim and wherein said protective shade/enclosure member includes first and second spaced sections, said first section being proximate said mating frame members and said second section being distal from said mating frame member; a pair of notches spaced for insertion of said keys into said notches in said first section; and said first section includes raised, half-dome shaped means, each located proximate to said notches, with one-half dome shaped means located on either side of each notch to hold the shade/enclosure in position once said keys of said outside frame member have been passed through said notches and over said half-dome shaped means.

15. An improved brooder lamp fixture according to claim 14 further including a second set of raised, half-dome shaped means located from said half-dome shaped means on either side of each notch to further limit travel of said keys along said first section.

16. An improved brooder lamp fixture for use in providing infrared radiation in brooder operations, such as for swine and poultry breeding, said brooder lamp fixture comprising:

an integral electrical plug, cord and bulb socket, said socket being provided with means to engage an infrared radiation-generating bulb, wherein said infrared radiation-generating bulb has a narrow first end adapted to engage said socket and a broad second and opposite end of larger dimension adapted to provide infrared radiation therefrom, said first end and said second and opposite end being separated by a length;

an interlocking mating frame member engagedly surrounding said electrical cord proximate to said socket, said mating frame member comprising a first and second interlocking semi-circular frame member component which frame member components are adapted to combine together to surround and engage said electrical cord, said frame member extending radially outward from said electrical cord proximate to said socket a distance of at least approximately equal to said larger dimension of an infrared bulb, and terminating in a circular outer rim; and, a depending protective shade/enclosure member adapted to fixedly engage said circular outer rim of said mating frame member and depend therefrom, and extending downward a distance of at least about nine inches to about fifteen inches from said frame member.

17. The improved brooder lamp fixture according to claim 16, wherein said depending protective shade/enclosure member extends downward a distance of at least about ten inches to about fourteen inches from said frame member.

18. The improved brooder lamp fixture according to claim 17, wherein said depending protective shade/enclosure member extends downward a distance of at least about eleven inches to about thirteen inches from said frame member.

19. The improved brooder lamp fixture according to claim 17, wherein said depending protective shade/enclosure member extends downward a distance of a bout twelve and one-quarter inches from said frame member.

20. The improved brooder lamp fixture according to claim 17, wherein said protective shade/enclosure member includes first and second spaced sections, said first section being proximate said mating frame members and said second section being distal from said mating frame member; and said second section of said protective shade/enclosure is flared outward by from about ten to about twenty degrees.

21. The improved brooder lamp fixture according to claim 20, wherein said second section of said protective shade/enclosure is flared outward by from about twelve to about eighteen degrees.

22. The improved brooder lamp fixture according to claim 20, wherein said second section of said protective shade/enclosure is flared outward by fifteen degrees.

23. The improved brooder lamp fixture according to claim 17, wherein said protective shade/enclosure member includes first and second spaced sections, said first section being proximate said mating frame members and said second section being distal from said mating frame member;

and said second section of said protective shade/enclosure is provided with a plurality of open louvers.

24. The improved brooder lamp fixture according to claim 23 further comprising a plurality of spaced louvers located in said first section proximate to and radially outwardly from said outer rim.

25. The improved brooder lamp fixture according to claim 23, wherein said plurality of open louvers are in an array of eight equi-radially spaced sets of three openings.

26. The improved brooder lamp fixture according to claim 25 further comprising a plurality of spaced louvers located in said first section proximate to and radially outwardly from said outer rim.

27. The improved brooder lamp fixture according to claim 17 wherein said protective shade/enclosure member includes first and second spaced sections, said first section being proximate said mating frame members and said second section being distal from said mating frame member; and said second section of said protective shade/enclosure is provided with three equi-radially spaced legs defining a planar surface adapted for contact with another surface.

28. The improved brooder lamp fixture according to claim 17 further comprising a plurality of spaced louvers located in said first section proximate to and radially outwardly from said outer rim.

* * * * *